(12) United States Patent
Hu et al.

(10) Patent No.: US 11,546,193 B2
(45) Date of Patent: Jan. 3, 2023

(54) DATA COMPRESSION METHOD AND APPARATUS

(71) Applicant: HUAWEI TECHNOLOGIES CO., LTD., Guangdong (CN)

(72) Inventors: Yuanzhou Hu, Shanghai (CN); Fan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/491,441

(22) Filed: Sep. 30, 2021

(65) Prior Publication Data

US 2022/0021570 A1 Jan. 20, 2022

Related U.S. Application Data

(63) Continuation of application No. PCT/CN2020/078619, filed on Mar. 10, 2020.

(30) Foreign Application Priority Data

Mar. 30, 2019 (CN) .......................... 201910253984.7

(51) Int. Cl.
*H04L 27/26* (2006.01)
*H04L 27/18* (2006.01)
*H04L 27/20* (2006.01)

(52) U.S. Cl.
CPC ........ *H04L 27/2607* (2013.01); *H04L 27/183* (2013.01); *H04L 27/20* (2013.01); *H04L 27/2614* (2013.01); *H04L 27/2628* (2013.01)

(58) Field of Classification Search
CPC ... H04L 27/2607; H04L 27/183; H04L 27/20; H04L 27/2614; H04L 27/2617
(Continued)

(56) References Cited

U.S. PATENT DOCUMENTS

2007/0183520 A1 8/2007 Kim et al.
2008/0144553 A1 6/2008 Shao et al.
(Continued)

FOREIGN PATENT DOCUMENTS

CN 103973436 A 8/2014
CN 105453627 A 3/2016
(Continued)

OTHER PUBLICATIONS

Qualcomm Incorporated, EVM Calculation for /2-BPSK w/ Spectrum Shaping. 3GPP TSG-RAN4 WG4 #85 , Reno, NV, US, Nov. 27-Dec. 1, 2017, R4-1713626, 6 pages.
(Continued)

*Primary Examiner* — Emmanuel Bayard

(57) ABSTRACT

Embodiments of this application provide a data compression method, including: performing first processing on π/2-binary phase shift keying BPSK modulated data with a length of M, to obtain first frequency domain data with a length of M, where the first processing includes Fourier transform, and M is an even number; performing second processing on second frequency domain data with a length of Q, to obtain time domain data, where data in the second frequency domain data is included in the first frequency domain data, Q is a positive integer, M is greater than Q, Q is greater than or equal to M/2, and the second processing includes inverse Fourier transform; and sending the time domain data on one time domain symbol.

15 Claims, 6 Drawing Sheets

(58) Field of Classification Search
USPC .......................................... 375/260, 262, 295
See application file for complete search history.

(56) References Cited

U.S. PATENT DOCUMENTS

| | | | |
|---|---|---|---|
| 2010/0091755 A1* | 4/2010 | Kwon .................. | H04L 5/0053 370/344 |
| 2016/0140083 A1* | 5/2016 | Shibayama ........... | G06F 17/156 708/300 |
| 2017/0373908 A1* | 12/2017 | Choi .................... | H04B 7/0697 |
| 2018/0048512 A1 | 2/2018 | Zeng et al. | |
| 2018/0324005 A1* | 11/2018 | Kim ..................... | H04L 5/0007 |
| 2019/0081840 A1 | 3/2019 | Park et al. | |
| 2020/0259693 A1* | 8/2020 | Baldemair ............ | H04L 5/0048 |
| 2022/0094583 A1* | 3/2022 | Sahin ................... | H04L 27/262 |

FOREIGN PATENT DOCUMENTS

| | | | |
|---|---|---|---|
| CN | 106027441 A | 10/2016 | |
| CN | 107888531 A | 4/2018 | |
| CN | 109067686 A | 12/2018 | |

OTHER PUBLICATIONS

3GPP TS 38.211 V15.5.0 (Mar. 2019), 3rd Generation Partnership Project; Technical Specification Group Radio Access Network; NR; Physical channels and modulation(Release 15), 96 pages.

3GPP TS 36.211 V15.5.0 (Mar. 2019), 3rd Generation Partnership Project; Technical Specification Group Radio Access Network; Evolved Universal Terrestrial Radio Access (E-UTRA); Physical channels and modulation(Release 15), 239 pages.

Jun Mashino et al: "A Sub-Spectrum Suppressed Transmission Scheme for Highly Efficient Satellite Communications", Sep. 5, 2011, pp. 1-5, XP032029522.

Qualcomm Incorporated: "EVM Calculation for $\pi/2$-BPSK w/ Spectrum Shaping", 3GPP Draft; R4-1713626,Nov. 17, 2017, XP051375272, total 6 pages.

Li Zibin et al: "DFT Spread Spectrally Efficient Frequency Division Multiplexing for IM-DD Transmission in C-Band",Oct. 26, 2019,XP011798648, total 7 pages.

\* cited by examiner

DATA COMPRESSION METHOD AND APPARATUS

CROSS-REFERENCE TO RELATED APPLICATIONS

This application is a continuation of International Application No. PCT/CN2020/078619, filed on Mar. 10, 2020, which claims priority to Chinese Patent Application No. 201910253984.7, filed on Mar. 30, 2019. The disclosures of the aforementioned applications are hereby incorporated by reference in their entireties.

TECHNICAL FIELD

Embodiments of this application relate to the field of communications technologies, and in particular, to a data compression method and an apparatus.

BACKGROUND

Based on a market demand, in a wireless communications system, for example, a long term evolution (LTE) or fifth generation (5G) mobile communications system, internet of things (IoT) communication is proposed. The IoT communication may be machine to machine (M2M) communication, machine type communication (MTC), or massive machine type communications (mMTC). The IoT communication may allow communication between terminal devices, or may allow communication between a terminal device and a network device without human intervention. For example, application scenarios of the IoT communication may include a smart grid, industrial automation control, a wireless sensor network, a smart home appliance, a smart water meter, a shared bicycle, and the like.

SUMMARY

According to a first aspect, a data sending method is provided, including: performing first processing on π/2-BPSK modulated data with a length of M, to obtain first frequency domain data with a length of M, where the first processing includes Fourier transform, and M is an even number; performing second processing on second frequency domain data with a length of Q, to obtain time domain data, where data in the second frequency domain data is included in the first frequency domain data, Q is a positive integer, M is greater than Q, Q is greater than or equal to M/2, and the second processing includes inverse Fourier transform; and sending the time domain data on one time domain symbol. Alternatively, a data sending method is provided, including: performing first processing on BPSK modulated data with a length of M, to obtain first frequency domain data with a length of M, where the first processing includes phase rotation and Fourier transform, and M is an even number; performing second processing on second frequency domain data with a length of Q, to obtain time domain data, where data in the second frequency domain data is included in the first frequency domain data, Q is a positive integer, M is greater than Q, Q is greater than or equal to M/2, and the second processing includes inverse Fourier transform; and sending the time domain data on one time domain symbol.

In the method provided in this embodiment of this application, frequency domain data with a length of M is compressed to obtain frequency domain compressed data with a shorter length, so that bandwidth occupied during actual data transmission can be lower. Therefore, spectral efficiency of data transmission can be improved. In addition, the modulated data in the method provided in this embodiment of this application is π/2-BPSK, so that a characteristic of a low PAPR of the sent time domain data can be maintained. In this method, a data transmission rate of a system can be improved. For example, on given system bandwidth, if bandwidth occupied when each UE performs data transmission is lower, more UEs can be simultaneously supported in performing data transmission, and an amount of data transmitted by each UE is not reduced. Therefore, the data transmission rate of the system is improved.

In a possible implementation, that data in the second frequency domain data is included in the first frequency domain data includes: a $q^{th}$ piece of frequency domain data in the second frequency domain data is an $(\lfloor(M-Q+1)/2\rfloor+q)^{th}$ piece of frequency domain data in the first frequency domain data; or a $q^{th}$ piece of frequency domain data in the second frequency domain data is an $(\lfloor(M-Q)/2\rfloor+q)^{th}$ piece of frequency domain data in the first frequency domain data; or a $q^{th}$ piece of frequency domain data in the second frequency domain data is an $(\lceil(M-Q)/2\rceil+q)^{th}$ piece of frequency domain data in the first frequency domain data, where a value of q is an integer ranging from 0 to Q−1.

A position of the data in the second frequency domain data in the first frequency domain data is determined by using the method, so that it can be ensured that the second frequency domain data obtained through compression is orthogonal to each other, thereby ensuring correctness of data received at a receive end.

In a possible implementation, the second processing includes: inverse Fourier transform and cyclic prefix adding; or frequency domain filtering, inverse Fourier transform, and cyclic prefix adding; or inverse Fourier transform, time domain filtering, and cyclic prefix adding. Optionally, a square root raised cosine SRRC filter or a root raised cosine RRC filter is used when the frequency domain filtering or the time domain filtering is performed, and a roll-off factor of a used filter is $$\frac{2Q}{M}-1.$$

In this method, it can be ensured that output data obtained after filtering is performed on the second frequency domain data is still orthogonal, so that correctness of the data received at the receive end can be ensured. In addition, when filtering is performed by using a filter, shaping may further be performed on the time domain data, so that an amplitude change in the time domain data on which shaping is performed is smoother, thereby reducing a PAPR.

In a possible implementation, when the inverse Fourier transform is performed, the method includes: mapping the second frequency domain data to Q subcarriers to perform Fourier transform, where a frequency domain resource used to send the π/2-BPSK modulated data with a length of M includes the Q subcarriers. In this method, frequency domain data with a length of M is compressed to obtain frequency domain compressed data with a shorter length, and the frequency domain compressed data is mapped to the Q subcarriers for sending. Compared with a manner in which the frequency domain compressed data is mapped to M subcarriers for sending, bandwidth occupied during actual data transmission can be lower. Therefore, spectral efficiency of data transmission can be improved.

In a possible implementation, the modulated data is π/2-BPSK modulated data, and that the first processing includes Fourier transform includes: The first processing sequentially includes phase rotation and Fourier transform. A phase factor of the phase rotation is $e^{-j\times\pi\times m/M}$, and Q=M/2. In this method, it can be ensured that the first frequency domain data is orthogonal, so that correctness of the data received at the receive end can be ensured.

In a possible implementation, the modulated data is BPSK modulated data, and that the first processing includes phase rotation and Fourier transform includes: The first processing sequentially includes first phase rotation, second phase rotation, and Fourier transform. A phase factor of the second phase rotation is $e^{-j\times\pi\times m/M}$, and Q=M/2.

According to a second aspect, an apparatus is provided. The apparatus may be a network device (or a terminal device), or may be an apparatus in a network device (or a terminal device), or an apparatus that can be used together with a network device (or a terminal device). In a design, the apparatus may include a corresponding module that performs the method/operation/step/action described in the first aspect. The module may be a hardware circuit, or may be software, or may be implemented by a hardware circuit in combination with software. In a design, the apparatus may include a processing module and a communications module. For example:

The processing module is configured to perform first processing on π/2-BPSK modulated data with a length of M, to obtain first frequency domain data with a length of M, where the first processing includes Fourier transform, and M is an even number; the processing module is further configured to perform second processing on second frequency domain data with a length of Q, to obtain time domain data, where data in the second frequency domain data is included in the first frequency domain data, Q is a positive integer, M is greater than Q, Q is greater than or equal to M/2, and the second processing includes inverse Fourier transform; and the communications module is configured to send the time domain data on one time domain symbol.

In a possible implementation, for descriptions of the first processing, the second processing, and the inverse Fourier transform, refer to related descriptions in the first aspect. Details are not described herein again.

According to a third aspect, an embodiment of this application provides an apparatus. The apparatus includes a processor, configured to implement the method described in the first aspect. The apparatus may further include a memory, configured to store instructions and data. The memory is coupled to the processor, and when the processor executes the instructions stored in the memory, the method described in the first aspect can be implemented. The apparatus may further include a communications interface. The communications interface is used by the apparatus to communicate with another device. For example, the communications interface may be a transceiver, a circuit, a bus, a module, or a communications interface of another type, and the another device may be a network device. In a possible device, the apparatus includes: a memory, configured to store program instructions.

The processor is configured to perform first processing on π/2-BPSK modulated data with a length of M, to obtain first frequency domain data with a length of M, where the first processing includes Fourier transform, and M is an even number; the processor is further configured to perform second processing on second frequency domain data with a length of Q, to obtain time domain data, where data in the second frequency domain data is included in the first frequency domain data, Q is a positive integer, M is greater than Q, Q is greater than or equal to M/2, and the second processing includes inverse Fourier transform; and the processor sends the time domain data on one time domain symbol through the communications interface.

In a possible implementation, for descriptions of the first processing, the second processing, and the inverse Fourier transform, refer to related descriptions in the first aspect. Details are not described herein again.

According to a fourth aspect, an embodiment of this application provides a computer program product including instructions. When the instructions are run on a computer, the computer is enabled to perform the method described in the first aspect or any possible design in the first aspect.

According to a fifth aspect, an embodiment of this application provides a computer-readable storage medium including instructions. When the instructions are run on a computer, the computer is enabled to perform the method described in the first aspect or any possible design in the first aspect.

According to a sixth aspect, an embodiment of this application provides a chip system. The chip system includes a processor, and may further include a memory, and is configured to implement the method described in the first aspect or any possible design in the first aspect.

According to a seventh aspect, an embodiment of this application provides a communications system. The communications system includes any apparatus described in the second aspect and a receiving apparatus, where the receiving apparatus is configured to receive data sent by any apparatus described in the second aspect; or the communications system includes any apparatus described in the third aspect and a receiving apparatus, where the receiving apparatus is configured to receive data sent by any apparatus described in the third aspect.

DESCRIPTION OF EMBODIMENTS

Figure 1:
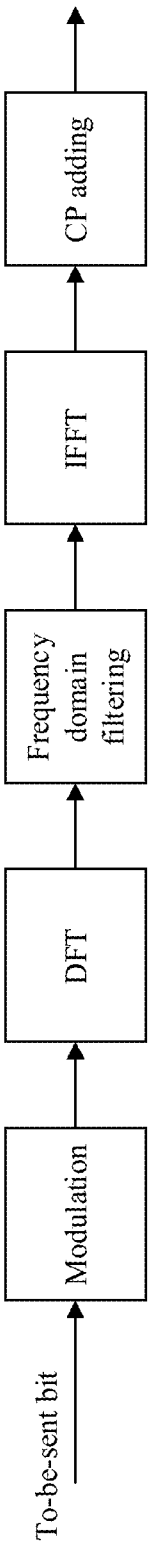
FIG. 1 and FIG. 2 are schematic diagrams of a data sending method according to an embodiment of this application.

The technical solutions provided in the embodiments of this application may be applied to various communications systems. For example, the technical solutions provided in the embodiments of this application may be applied to a communications system that can support IoT. For example, the technical solutions provided in the embodiments of this application may be applied to but are not limited to 5G, LTE, or a future communications system. 5G may also be referred to as new radio (NR).

The technical solutions provided in the embodiments of this application may be applied to wireless communication between communications devices. The communications devices may include a network device and a terminal device. The wireless communication between communications devices may include: wireless communication between a network device and a terminal device, wireless communication between network devices, and wireless communication between terminal devices. In the embodiments of this application, the term "wireless communication" may also be referred to as "communication", and the term "communication" may also be described as "data transmission", "signal transmission", "information transmission", "transmission", or the like. In the embodiments of this application, transmission may include sending or receiving. For example, transmission may be uplink transmission, for example, the transmission may be that a terminal device sends a signal to a network device; or transmission may be downlink transmission, for example, the transmission may be that a network device sends a signal to a terminal device.

When applied to a communications system, the technical solutions provided in the embodiments of this application may be applied to various access technologies, for example, an orthogonal multiple access (OMA) technology or a non-orthogonal multiple access (NOMA) technology. When applied to the orthogonal multiple access technology, the technical solutions may be applied to technologies such as orthogonal frequency division multiple access (OFDMA) or single carrier frequency division multiple access (SC-FDMA). This is not limited in the embodiments of this application. When applied to the non-orthogonal multiple access technology, the technical solutions may be applied to technologies such as sparse code multiple access (SCMA), multi-user shared access (MUSA), pattern division multiple access (PDMA), interleave-grid multiple access (IGMA), resource spread multiple access (RSMA), non-orthogonal coded multiple access (NCMA), or non-orthogonal coded access (NOCA). This is not limited in the embodiments of this application.

The technical solutions provided in the embodiments of this application are described by using communication between a network device and a terminal device as an example. The network device is a scheduling entity, and the terminal device is a subordinate entity. A person skilled in the art may apply the technical solutions to wireless communication between another scheduling entity and another subordinate entity, for example, wireless communication between a macro base station and a micro base station, for example, device-to-device (D2D) communication between a first terminal and a second terminal.

The terminal device involved in the embodiments of this application may also be referred to as a terminal, and may be a device with a wireless transceiver function. The terminal may be deployed on land, and includes an indoor terminal, an outdoor terminal, a handheld terminal, or a vehicle-mounted terminal; or may be deployed on a surface of water (for example, a ship); or may be deployed in the air (for example, an airplane, a balloon, or a satellite). The terminal device may be user equipment (UE). The UE includes a handheld device, a vehicle-mounted device, a wearable device, or a computing device that has a wireless communications function. For example, the UE may be a mobile phone, a tablet computer, or a computer with a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this application, an apparatus configured to implement a function of the terminal may be a terminal, or may be an apparatus that can support the terminal in implementing the function, for example, a chip system. In the embodiments of this application, the chip system may include a chip, or may include a chip and another discrete device. In the embodiments of this application, the technical solutions provided in the embodiments of this application are described by using an example in which the apparatus configured to implement the function of the terminal is a terminal and the terminal is UE.

The network device involved in the embodiments of this application includes a base station (BS). The base station may be a device that is deployed in a radio access network and that can perform wireless communication with the terminal. The base station may be in a plurality of forms, for example, a macro base station, a micro base station, a relay station, and an access point. For example, the base station involved in the embodiments of this application may be a base station in 5G or a base station in LTE. The base station in 5G may also be referred to as a transmission reception point (TRP) or a gNB (gNodeB). In the embodiments of this application, an apparatus configured to implement a function of the network device may be a network device, or may be an apparatus that can support the network device in implementing the function, for example, a chip system. In the embodiments of this application, the technical solutions provided in the embodiments of this application are described by using an example in which the apparatus configured to implement the function of the network device is a network device and the network device is a base station.

In the embodiments of this application, a transmit end sends data or a signal to a receive end. The transmit end may be a base station or UE. The receive end may be a base station or UE. For example, when data transmission is downlink (DL), the transmit end is a base station, and the receive end is UE. When data transmission is uplink (UL), the transmit end is UE, and the receive end is a base station. When data transmission is DL in wireless backhaul, the transmit end is a macro base station, and the receive end is a micro base station. When data transmission is UL in wireless backhaul, the transmit end is a micro base station, and the receive end is a macro base station. When data transmission is D2D communication or vehicle to everything (V2X) communication, the transmit end is first UE, and the receive end is second UE. In the embodiments of this application, words such as "first" and "second" are used for distinguishing purposes, and cannot be understood as an indication or an implication of relative importance, or as an indication or an implication of a sequence.

In a communications system, when a transmit end sends data to a receive end, time domain data generated by the transmit end may be amplified by a power amplifier (PA) and then sent to the receive end. When the time domain data passes through the PA, to ensure amplification efficiency, there may be specific requirements for a peak to average power ratio (PAPR) of the time domain data. Amplification performance of high-PAPR time domain data after passing through the PA may be nonlinear, and low-PAPR time domain data may work at a higher working point after passing through a nonlinear PA. In other words, output power of the low-PAPR time domain data after passing through the PA is greater than output power of the high-PAPR time domain data after passing through the PA. Therefore, receiver performance is also better. For example, for a high frequency (HF) scenario, an IoT scenario, or a V2X scenario, linearity of PAs used in these scenarios is relatively poor, and therefore a low-PAPR waveform (or sending method) is required. In other words, a PAPR of time domain data sent by using the waveform needs to be relatively low, for example, 1 dB, 2 dB, or 3 dB.

To implement a low-PAPR data sending method, a sending method using an "SC-FDMA+Pi/2-binary phase shift keying (BPSK) modulation scheme" is proposed. Pi is a ratio of circumference to diameter, and Pi/2-BPSK is used to modulate data of every one bit into one complex symbol. In the sending method using SC-FDMA+Pi/2-BPSK, processing shown in FIG. 1 may be performed on to-be-sent data (a to-be-sent bit). As shown in FIG. 1, for a to-be-sent bit, a transmit end may sequentially perform Pi/2-BPSK modulation, discrete Fourier transform (DFT), frequency domain filtering, and inverse fast Fourier transform (IFFT), and cyclic prefix (CP) adding on the to-be-sent bit, to obtain time domain data, and send the obtained time domain data to a receive end. In this embodiment of this application, Pi/2-BPSK may also be described as $\pi/2$-BPSK, where $\pi$ indicates the ratio of circumference to diameter.

The data sending method using SC-FDMA+Pi/2-BPSK can reduce the PAPR, but has lower spectral efficiency than a data sending method using an "SC-FDMA+high-order modulation scheme (for example, quadrature phase shift keying (QPSK))". The data sending method using the SC-FDMA+QPSK modulation scheme is shown in FIG. 1, in which modulation is specifically QPSK modulation. In processing of the to-be-sent bit, Pi/2-BPSK is used to modulate data of every one bit into one complex symbol, QPSK is used to modulate data of every two bits into one complex symbol, and one complex symbol may be mapped to one resource unit for sending. Therefore, compared with QPSK, when Pi/2-BPSK is used, a quantity of bits carried on each time frequency resource is halved. In other words, the data sending method using SC-FDMA+Pi/2-BPSK has lower spectral efficiency. The resource unit may be, for example, a resource element (RE) in the LTE 36.211 standard protocol or the 5G 38.211 standard protocol, or may be another resource unit. This is not limited in this embodiment of this application. One RE corresponds to one time domain symbol in time domain, and corresponds to one subcarrier in frequency domain.

Figure 2:
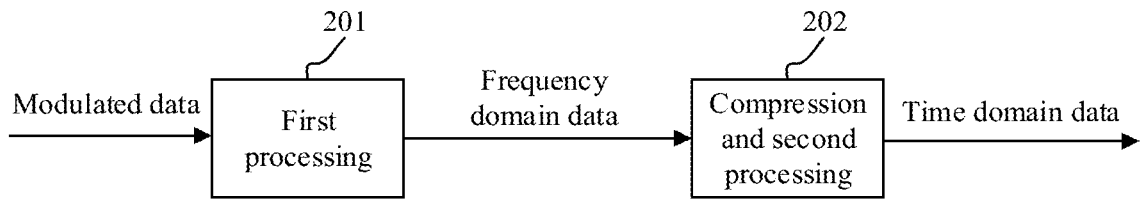

To resolve the problem that the spectral efficiency of the data sending method using SC-FDMA+Pi/2-BPSK is relatively low, an embodiment of this application provides a signal sending method shown in FIG. 2. The signal sending method may also be referred to as a data compression method.

S201. A transmit end performs first processing on $\pi/2$-BPSK modulated data with a length of M, to obtain first frequency domain data with a length of M, where the first processing includes Fourier transform.

In this embodiment of this application, when a piece of data is $\pi/2$-BPSK modulated data, it indicates that the data is data obtained after if $\pi/2$-BPSK modulation is performed on a to-be-modulated bit. In this embodiment of this application, the modulated data may also be referred to as a modulated symbol. One piece of modulated data is one complex number. Optionally, when an imaginary part of the complex number is equal to 0, the complex number is equivalent to a real number.

In this embodiment of this application, the if $\pi/2$-BPSK modulated data with a length of M represents M pieces of if $\pi/2$-BPSK modulated data. For example, if the to-be-modulated bit includes M bits, the transmit end performs if $\pi/2$-BPSK modulation on each of the M bits, to obtain the if $\pi/2$-BPSK modulated data with a length of M. The to-be-modulated bit may also be referred to as a to-be-modulated bit stream, a to-be-sent bit, a to-be-sent bit stream, or the like.

For example, the to-be-modulated bit is represented as b, and b includes M bits, where an $m^{th}$ bit is represented as b(m), and a value of b(m) is 0 or 1. A value of M ranges from 0 to M−1. In other words, m may be taken from 0 to M−1. $\pi/2$-BPSK modulation may be performed on the to-be-modulated bit b to obtain $\pi/2$-BPSK modulated data d with a length of M, where an $m^{th}$ piece of data in d is represented as d(m).

Optionally, $$d(m) = \frac{e^{j \times \pi \times (m \bmod 2)/2}}{\sqrt{2}} \times [(1 - 2 \times b(m)) + j \times (1 - 2 \times b(m))],$$

where j represents an imaginary unit, a square of the imaginary unit is equal to −1, and mod represents a modulo operation. In this embodiment of this application, another $\pi/2$-BPSK modulation scheme may be used, to obtain the modulated data d, and the modulated data satisfies the following: A phase difference between two adjacent pieces of data in the modulated data d is $\pi/2$ or $-\pi/2$, or a phase difference between two adjacent pieces of data in the modulated data d is $\pi/2$ or $3\pi/2$. For example, a phase difference between d(m) and d(m+1) is $\pi/2$ or $-\pi/2$, or is $\pi/2$ or $3\pi/2$, where a value of m+1 ranges from 1 to M−1.

In this embodiment of this application, the to-be-modulated bit may be a bit stream Str1 on which physical-layer bit-level processing is not performed, or may be a bit stream Str2 obtained after physical-layer bit-level processing is performed on Str1. The physical-layer bit-level processing may include one or more of the following processing: segmentation, cascading, channel coding, rate matching, scrambling, cyclic redundancy check (CRC) adding, and the like. Optionally, for the physical-layer bit-level processing, refer to the LTE protocols 36.212 and 36.211, or refer to the NR protocols 38.212 and 38.211, or refer to other bit-level processing. This is not limited in this embodiment of this application. The bit stream Str1 may be a transport block delivered by a media access control (MAC) layer of the transmit end to a physical layer of the transmit end, or the bit stream Str1 is an information bit of a physical-layer control channel. The transmit end may process Str1 or Str2, and then include Str1 or Str2 to a corresponding channel and send Str1 or Str2 to the receive end.

In a possible implementation, the first processing includes Fourier transform. The transmit end may perform Fourier transform on the $\pi/2$-BPSK modulated data d with a length of M, to obtain first frequency domain data X with a length of M, where a $k^{th}$ piece of data in the first frequency domain data X is represented as x(k), and a value of k ranges from 0 to M−1.

For example, $$x(k) = \frac{1}{\sqrt{M_{scale}^{fft}}} \sum_{m=0}^{M-1} d(m) \times e^{-j \times 2\pi \times k \times m/M}.$$

j represents an imaginary unit; and a coefficient $M_{scale}^{fft}$ is used to adjust power of output data obtained after Fourier transform, where $M_{scale}^{fft}$ is a real number, for example, $M_{scale}^{fft} = M$ or 1.

In a possible implementation, the first processing includes phase rotation and Fourier transform. The transmit end may sequentially perform phase rotation and Fourier transform on the π/2-BPSK modulated data d with a length of M, to obtain first frequency domain data X with a length of M, where a $k^{th}$ piece of data in the first frequency domain data X is represented as x(k), and a value of k ranges from 0 to M−1.

For example, $$x(k) = \frac{1}{\sqrt{M_{scale}^{fft}}} \sum_{m=0}^{M-1} d(m) \times e^{j \times \beta_m} \times e^{-j \times 2\pi \times k \times m/M}.$$

j represents an imaginary unit; and a coefficient $M_{scale}^{fft}$ is used to adjust power of output data obtained after Fourier transform, where $M_{scale}^{fft}$ is a real number, for example, $M_{scale}^{fft}$=M or 1. $e^{j \times \beta_m}$ represents a phase rotation factor, and the phase rotation factor may be determined by M. For example, a value of $e^{j \times \beta_m}$ is $e^{-j \times \pi \times m/M}$. This method may be applied to a scenario in which Q=M/2, or may be applied to another scenario. This is not limited in this embodiment of this application. For descriptions of Q, refer to S202.

In this embodiment of this application, the Fourier transform may be discrete Fourier transform (DFT), fast Fourier transform (FFT), or Fourier transform in another form. This is not limited in this application.

S202. The transmit end performs second processing on second frequency domain data with a length of Q, to obtain time domain data, and sends the time domain data on one time domain symbol. The second frequency domain data is compressed data of the first frequency domain data, Q is a positive integer, and M is greater than or equal to Q.

The transmit end may determine values of M and Q in the following manner.

Optionally, the values of M and Q are preconfigured; or the values of M and Q are notified by a base station to UE by using signaling; or the value of M is preconfigured, and the value of Q is notified by a base station to UE by using signaling; or the value of Q is preconfigured, and the value of M is notified by a base station to UE by using signaling.

Optionally, values of M and Q/M (a ratio of Q to M) are preconfigured; or values of M and Q/M are notified by a base station to UE by using signaling; or the value of M is preconfigured, and a value of Q/M is notified by a base station to UE by using signaling; or a value of Q/M is preconfigured, and the value of M is notified by a base station to UE by using signaling. In the method, M may be replaced with Q, and/or Q/M may be replaced with M/Q. In this method, M and Q can be determined after M and Q/M are known. For example, if a candidate value of Q/M is ½ or 1, the base station may configure a specific value of Q/M for the UE by using one bit. For example, when the bit is 0, the specific value of Q/M is ½, and when the bit is 1, the specific value of Q/M is 1.

That the second frequency domain data is compressed data of the first frequency domain data includes: Data in the second frequency domain data is included in the first frequency domain data.

For example, the second frequency domain data may be determined in any one of the following manners 1 to 6. Alternatively, it may be described as: The first frequency domain data may be compressed in any one of the following manners 1 to 6 to obtain the second frequency domain data.

Manner 1: A $q^{th}$ piece of frequency domain data in the second frequency domain data is an $(\lfloor(M-Q+1)/2\rfloor+q)^{th}$ piece of frequency domain data in the first frequency domain data, that is, $y(q)=x(\lfloor(M-Q+1)/2\rfloor+q)$. $x(\lfloor(M-Q+1)/2\rfloor+q)$ represents the $(\lfloor(M-Q+1)/2\rfloor+q)^{th}$ piece of frequency domain data in the first frequency domain data. Optionally, M is an even number, and Q is greater than or equal to M/2. In the manner 1 to the manner 6, y (q) represents a $q^{th}$ piece of frequency domain data in the second frequency domain data Y, and a value of q is an integer ranging from 0 to Q−1.

Figure 3A:
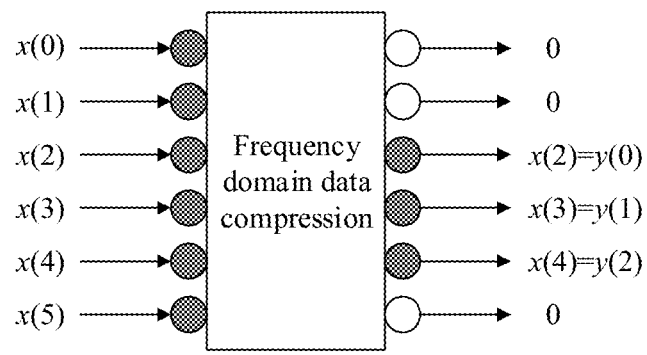
FIG. 3(a) to FIG. 3(g) are an example diagram of a data compression method according to an embodiment of this application.

For example, when M=6 and Q=M/2=3, when $y(q)=x(\lfloor(M-Q+1)/2\rfloor+q)$, as shown in FIG. 3(a), three pieces of data in the second frequency domain data that may be obtained through compression are respectively a second piece of data, a third piece of data, and a fourth piece of data in the first frequency domain data.

Figure 3B:
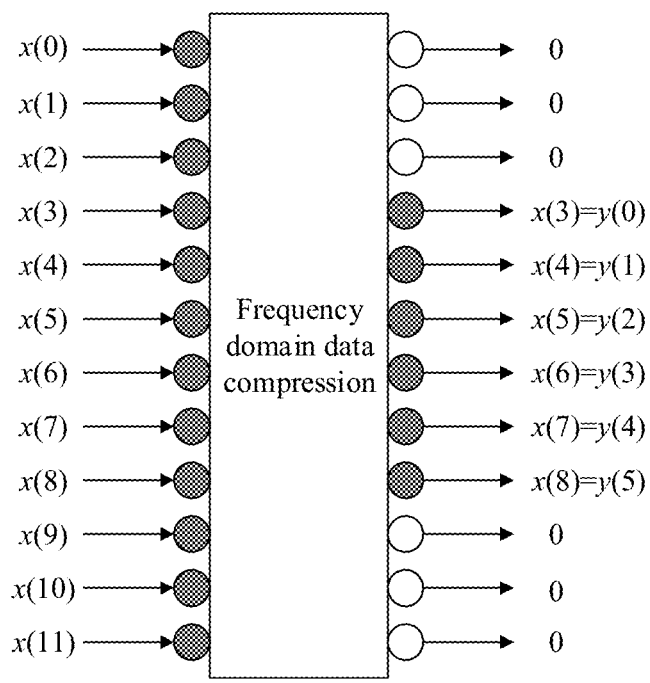

For example, when M=12 and Q=M/2=6, when $y(q)=x(\lfloor(M-Q+1)/2\rfloor+q)$, as shown in FIG. 3(b), six pieces of data in the second frequency domain data that may be obtained through compression are respectively a third piece of data, a fourth piece of data, a fifth piece of data, a sixth piece of data, a seventh piece of data, and an eighth piece of data in the first frequency domain data.

Figure 3C:
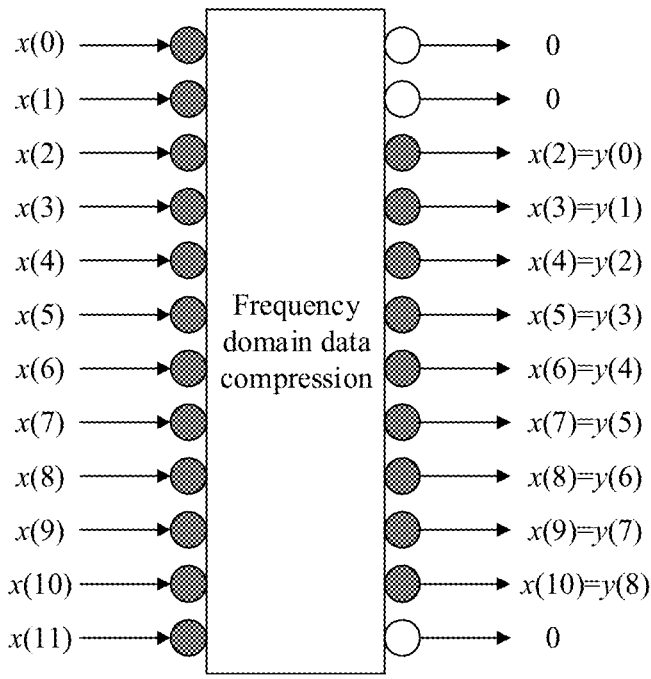

For example, when M=12, Q>M/2, and Q=9, when $y(q)=x(\lfloor(M-Q+1)/2\rfloor+q)$, as shown in FIG. 3(c), nine pieces of data in the second frequency domain data that may be obtained through compression are respectively a second piece of data, a third piece of data, a fourth piece of data, a fifth piece of data, a sixth piece of data, a seventh piece of data, a eighth piece of data, a ninth piece of data, and a tenth piece of data in the first frequency domain data.

Manner 2: A $q^{th}$ piece of frequency domain data in the second frequency domain data is an $(\lceil(M-Q)/2\rceil+q)^{th}$ piece of frequency domain data in the first frequency domain data, that is, $y(q)=x(\lceil(M-Q)/2\rceil+q)$. $x(\lceil(M-Q)/2\rceil+q)$ represents the $(\lceil(M-Q)/2\rceil+q)^{th}$ piece of frequency domain data in the first frequency domain data. Optionally, M is an even number, and Q is greater than or equal to M/2.

Manner 3: A $q^{th}$ piece of frequency domain data in the second frequency domain data is an $(\lfloor(M-Q)/2\rfloor+q)^{th}$ piece of frequency domain data in the first frequency domain data, that is, $y(q)=x(\lfloor(M-Q)/2\rfloor+q)$. $x(\lfloor(M-Q)/2\rfloor+q)$ represents the $(\lfloor(M-Q)/2\rfloor+q)^{th}$ piece of frequency domain data in the first frequency domain data. Optionally, M is an even number, and Q is greater than or equal to M/2.

Manner 4: A $q^{th}$ piece of frequency domain data in the second frequency domain data is a $(2q)^{th}$ piece of frequency domain data in the first frequency domain data, that is, $y(q)=x(2q)$. $x(2q)$ represents the $(2q)^{th}$ piece of frequency domain data in the first frequency domain data, and 2q is an integer greater than or equal to 0 and less than or equal to M.

Figure 3D:
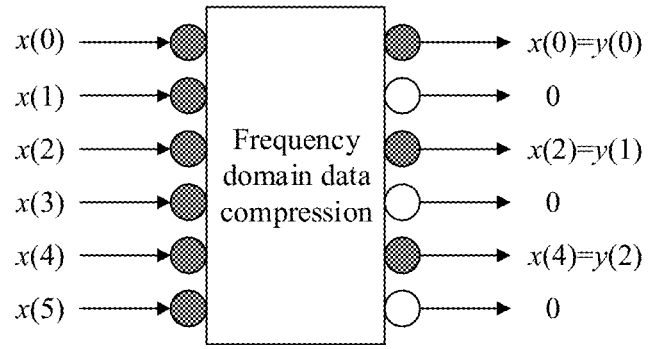

For example, when M=6 and Q=M/2=3, when $y(q)=x(2q)$, as shown in FIG. 3(d), three pieces of data in the second frequency domain data that may be obtained through compression are respectively a zeroth piece of data, a second piece of data, and a fourth piece of data in the first frequency domain data.

Manner 5: A $q^{th}$ piece of frequency domain data in the second frequency domain data is a $(2q+1)^{th}$ piece of frequency domain data in the first frequency domain data, that is, $y(q)=x(2q+1)$. $x(2q+1)$ represents the $(2q+1)^{th}$ piece of frequency domain data in the first frequency domain data, and 2q+1 is an integer greater than or equal to 0 and less than or equal to M.

Figure 3E:
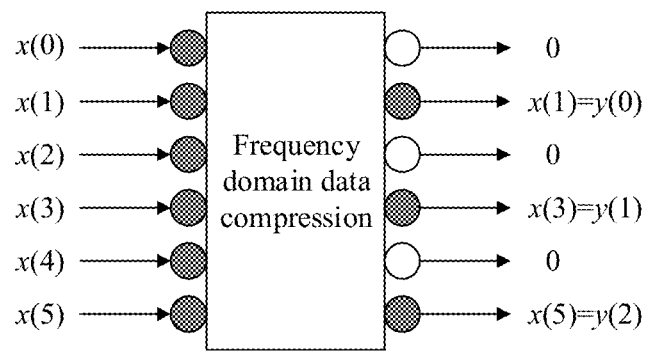

For example, when M=6 and Q=M/2=3, when $y(q)=x(2q+1)$, as shown in FIG. 3(e), three pieces of data in the second frequency domain data that may be obtained through compression are respectively a first piece of data, a third piece of data, and a fifth piece of data in the first frequency domain data.

Manner 6: When Q=M/2, data in the second frequency domain data is data in the first frequency domain data, and is data other than the second frequency domain data determined in the foregoing manner 1, or is data other than the second frequency domain data determined in the foregoing manner 2, or is data other than the second frequency domain data determined in the foregoing manner 3.

In a possible implementation, the data in the second frequency domain data is data in the first frequency domain data other than the second frequency domain data determined in the foregoing manner 1. For example, the $q^{th}$ piece of frequency domain data in the second frequency domain data is a $(mod(\lfloor(M-Q+1)/2\rfloor-1-q+M,M))^{th}$ piece of frequency domain data in the first frequency domain data, that is, $y(q)=x(mod(\lfloor(M-Q+1)/2\rfloor-1-q+M,M))$, where mod represents a modulo operation.

Figure 3F:
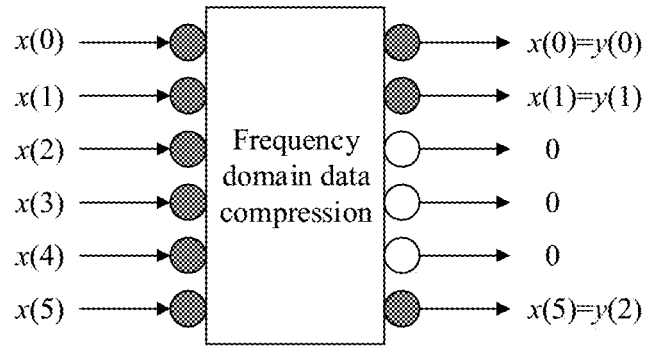

For example, when M=6 and Q=M/2=3, when $y(q)=x(mod(\lfloor(M-Q+1)/2\rfloor-1-q+M,M))$, as shown in FIG. 3(f), three pieces of data in the second frequency domain data that may be obtained through compression are respectively a first piece of data, a zeroth piece of data, and a fifth piece of data in the first frequency domain data.

Figure 3G:
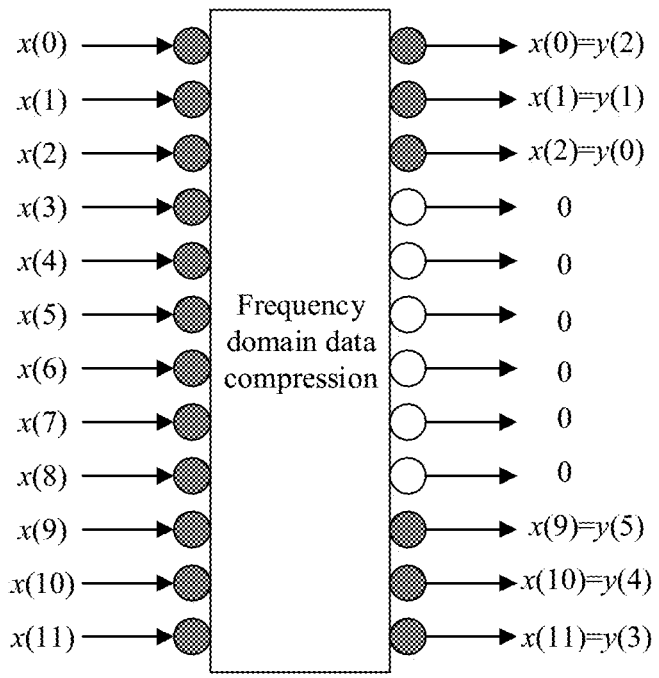

For example, when M=12 and Q=M/2=6, when $y(q)=x(mod(\lfloor(M-Q+1)/2\rfloor-1-q+M,M))$, as shown in FIG. 3(g), six pieces of data in the second frequency domain data that may be obtained through compression are respectively a second piece of data, a first piece of data, a zeroth piece of data, an eleventh piece of data, a tenth piece of data, and a ninth piece of data in the first frequency domain data.

In a possible implementation, when Q=M/2, the data in the second frequency domain data is data in the first frequency domain data other than the second frequency domain data determined in the foregoing manner 2. For example, the $q^{th}$ piece of frequency domain data in the second frequency domain data is a $(mod(\lceil(M-Q)/2\rceil-1-q+M,M))^{th}$ piece of frequency domain data in the first frequency domain data, that is, $y(q)=x(mod(\lceil(M-Q)/2\rceil-1-q+M,M))$, where mod represents a modulo operation.

In a possible implementation, when Q=M/2, the data in the second frequency domain data is data in the first frequency domain data other than the second frequency domain data determined in the foregoing manner 3. For example, the $q^{th}$ piece of frequency domain data in the second frequency domain data is a $(mod(\lfloor(M-Q)/2\rfloor-1-q+M,M))^{th}$ piece of frequency domain data in the first frequency domain data, that is, $y(q)=x(mod(\lfloor(M-Q)/2\rfloor-1-q+M,M))$.

In the method provided in this embodiment of this application, a data index in the second frequency domain data may be different from that in an example shown in FIG. 3(a) to FIG. 3(g). The foregoing manners 1 to 6 are merely example descriptions. The data in the second frequency domain data may alternatively be other data in the first frequency domain data. This is not limited in this embodiment of this application.

The transmit end performs the second processing on the second frequency domain data with a length of Q, to obtain the time domain data. The second processing may sequentially include:

inverse Fourier transform; or inverse Fourier transform and cyclic prefix adding; or frequency domain filtering and inverse Fourier transform; or inverse Fourier transform and time domain filtering; or frequency domain filtering, inverse Fourier transform, and cyclic prefix adding; or inverse Fourier transform, time domain filtering, and cyclic prefix adding.

In a possible implementation, when the transmit end performs the second processing on the second frequency domain data, if the second processing includes frequency domain filtering or time domain filtering, a square root raised cosine (SRRC) filter, a root raised cosine (RRC) filter, or a filter of another form may be used to perform filtering. This is not limited in this embodiment of this application. Optionally, a roll-off factor of the SRRC filter or the filter is $$\frac{2Q}{M}-1.$$

The frequency domain filtering may be represented as a product of the frequency domain data and a filtering coefficient, and the time domain filtering may be represented as a cyclic convolution of time domain data obtained after inverse Fourier transform and a filtering coefficient.

To simplify description, in this embodiment of this application, an implementation process of the second processing is described in detail by using an example in which the second processing sequentially includes frequency domain filtering, inverse Fourier transform, and cyclic prefix adding.

Frequency Domain Filtering:

The transmit end performs frequency domain filtering on the second frequency domain data with a length of Q, to obtain frequency domain filtered data $y_{filter}(q)$ with a length of Q. A $q^{th}$ piece of data $y_{filter}(q)$ in the frequency domain filtered data $Y_{filter}$ is equal to a $q^{th}$ piece of data $y(q)$ in the second frequency domain data multiplied by a frequency domain filter coefficient $s_{filter}(q)$. $s_{filter}(q)$ is a $q^{th}$ coefficient in a frequency domain filter coefficient S, and a value of q is an integer ranging from 0 to Q−1. In other words:

$$y_{filter}(q)=y(q)\times s_{filter}(q), q=0, 1, 2, \ldots, Q-1.$$

Optionally, when all coefficients in the frequency domain filter coefficient S are 1, the second frequency domain data Y is the same as the frequency domain filtered data $Y_{filter}$. In other words, it may be considered that the second processing does not include frequency domain filtering. Optionally, a length of the frequency domain filter coefficient S is Q (that is, the frequency domain filter coefficient S includes Q filter coefficients), or a length of the frequency domain filter coefficient S is greater than Q. This is not limited in this embodiment of this application.

Optionally, when the length of the frequency domain filter coefficient S is Q, the coefficient in the frequency domain filter coefficient S is included in a base frequency domain filter coefficient $S_{base}$. In this embodiment of this application, the frequency domain filter coefficient S may be referred to as a first filter coefficient or another name, and the base frequency domain filter coefficient $S_{base}$ may be referred to as an initial frequency domain filter coefficient, a second frequency domain filter coefficient, or another name. This is not limited in this embodiment of this application.

Optionally, $S_{base}$ includes M coefficients. A method for determining the frequency domain filter coefficient S based on the base frequency domain filter coefficient $S_{base}$ is similar to the foregoing method for determining the second frequency domain data from the first frequency domain data. The first frequency domain data is similar to the base frequency domain filter coefficient $S_{base}$, and the second frequency domain data is similar to the frequency domain filter coefficient S. A manner for determining the second frequency domain data from the first frequency domain data and a manner for determining the frequency domain filter coefficient S from the base frequency domain filter coefficient $S_{base}$ may be the same or different. This is not limited in this embodiment of this application. For example, the second frequency domain data is determined from the first frequency domain data in the manner 1, and the frequency domain filter coefficient S is determined from the base frequency domain filter coefficient $S_{base}$ in the manner 1. For another example, the second frequency domain data is determined from the first frequency domain data in the manner 1, and the frequency domain filter coefficient S is determined from the base frequency domain filter coefficient $S_{base}$ in the manner 2.

In this embodiment of this application, frequency domain filtering and frequency domain data compression may be performed separately or may be performed in combination. This is not limited in this embodiment of this application. For example, when the frequency domain filtering and the frequency domain data compression are performed in combination, and a frequency domain data compression manner is the foregoing manner 1, this implementation may be represented as $y_{filter}(q)=x(\lfloor(M-Q+1)/2\rfloor+q) \times s_{filter}(q)$, $q=0, 1, 2, \ldots, Q-1$.

Inverse Fourier Transform:

When performing the inverse Fourier transform on the frequency domain filtered data $Y_{filter}$, the transmit end maps Q pieces of data in the frequency domain filtered data $Y_{filter}$ one-to-one to corresponding Q subcarriers, and performs the inverse Fourier transform. The Q subcarriers are located on a same time domain symbol. The one-to-one mapping of the Q pieces of data to the corresponding Q subcarriers may be further described as: mapping the Q pieces of data one-to-one to corresponding Q resource elements (RE), where the Q REs correspond to or are located on a same time domain symbol, and one RE frequency domain corresponds to one subcarrier.

Optionally, positions of the Q subcarriers to which the frequency domain filtered data $Y_{filter}$ is mapped may be preconfigured. When the transmit end is UE, the positions may also be indicated by a base station to the UE by using signaling. For example, the base station may indicate, to the UE, positions of RBs at which the Q subcarriers are located, and the Q subcarriers are included in a frequency domain resource used to send the π/2-BPSK modulated data with a length of M. For example, the base station indicates a frequency domain resource of a data channel to the UE by using signaling, the frequency domain resource is positions of RBs at which the Q subcarriers are located, and the data channel is used to carry the π/2-BPSK modulated data with a length of M. For descriptions of the RB, refer to the LTE protocol 36.211, the NR protocol 38.211, or a future communications system. This is not limited in this embodiment of this application. Positions of the Q subcarriers may be consecutive or discrete. When the positions of the Q subcarriers are discrete, the Q subcarriers include at least two subcarriers, and none of the at least two subcarriers is adjacent to another subcarrier in the Q subcarriers in frequency domain. In this embodiment of this application, at least two may be two, three, four, or more. This is not limited in this embodiment of this application.

In this embodiment of this application, the signaling may be semi-static signaling and/or dynamic signaling. The semi-static signaling may also be referred to as higher layer signaling.

In this embodiment of this application, the semi-static signaling may be radio resource control (RRC) signaling, a broadcast message, a system message, or a media access control (MAC) control element (CE). The broadcast message may include remaining minimum system information (RMSI).

In this embodiment of this application, the dynamic signaling may be physical-layer signaling. The physical-layer signaling may be signaling carried on a physical control channel or signaling carried on a physical data channel. The physical data channel may be a downlink channel, for example, a physical downlink shared channel (PDSCH). The physical control channel may be a physical downlink control channel (PDCCH), an enhanced physical downlink control channel (EPDCCH), a narrowband physical downlink control channel (NPDCCH), or a machine type communication (MTC) physical downlink control channel (MPDCCH). Signaling carried on the PDCCH or the EPDCCH may also be referred to as downlink control information (DCI). The physical control channel may alternatively be a physical sidelink control channel, and signaling carried on the physical sidelink control channel may also be referred to as sidelink control information (SCI).

Optionally, the data in the frequency domain filtered data $Y_{filter}$ may be mapped one-to-one to Q consecutive subcarriers. For example, if a start position of the Q subcarriers is $q_{sc}^{start}$, positions of the Q subcarriers are respectively: $q_{sc}^{start}$, $q_{sc}^{start}+1$, $q_{sc}^{start}+2$, $\ldots$, $q_{sc}^{start}+Q-1 \cdot q_{sc}^{start}$ is a position of a start subcarrier, and $q_{sc}^{start}$ is an integer, for example, 0, 1, or 2.

Optionally, the data in the frequency domain filtered data $Y_{filter}$ may be mapped one-to-one to the Q subcarriers with equal spacings. For example, if a start position of the Q subcarriers is $q_{sc}^{start}$, and a spacing between adjacent subcarriers is $q_{step}$, a position of a $q^{th}$ subcarrier in the Q subcarriers is $q_{sc}^{start}+g \times q_{step}$, where a value of g ranges from 0 to Q-1. $q_{sc}^{start}$ is a position of a start subcarrier, and $q_{sc}^{start}$ is an integer, for example, 0, 1, or 2. $q_{step}$ is a positive integer, for example, 1, 2, or 3.

Optionally, the data in the frequency domain filtered data $Y_{filter}$ may be mapped one-to-one to Q subcarriers in the M subcarriers. Positions of the Q subcarriers in the M subcarriers are the same as a position of the second frequency domain data in the first frequency domain data. In other words, a method for determining the positions of the Q subcarriers in the M subcarriers is the same as a method for determining the position of the second frequency domain data in the first frequency domain data. Positions of the M subcarriers may be preconfigured. When the transmit end is UE, the positions may also be indicated by the base station to the UE by using signaling. For example, the base station may indicate, to the UE, positions of RBs at which the M subcarriers are located.

For example, the transmit end is UE, and the positions of the M subcarriers indicated to the UE by the base station device by using signaling are [12, 13, 14, 15, 16, 17]. Assuming that M=6 and Q=3, if the second frequency domain data is determined from the first frequency domain data in the foregoing manner 1, the second frequency domain data includes a second piece of data, a third piece of data, and a fourth piece of data in the first frequency domain data, and the three pieces of data in the frequency domain filtered data $Y_{filter}$ are mapped one-to-one to a second subcarrier, a third subcarrier, and a fourth subcarrier in the M subcarriers. In other words, positions of the three subcarriers to which the three pieces of data are mapped are respectively [14, 15, 16].

In this embodiment of this application, the inverse Fourier transform may be inverse discrete Fourier transform (IDFT), or inverse fast Fourier transform (IFFT), or inverse Fourier transform of another form. This is not limited in this embodiment of this application. For example, when the transmit end performs inverse Fourier transform on the frequency domain filtered data $Y_{filter}$, an inverse Fourier transform method in the LTE standard 36.211 or the NR standard 38.211 may be used.

For example, after the transmit end performs the inverse Fourier transform on the frequency domain filtered data $Y_{filter}$, a time domain signal is obtained, and the time domain signal is represented as the following at a moment t:

$$s(t) = \frac{1}{\sqrt{N_{scale}^{ifft}}} \sum_{q=0}^{Q-1} y_{filter}(q) e^{j \times 2\pi \times \Delta f \times L_q \times (t + t_{offset})}.$$

t is a real number. $y_{filter}(q)$ is a $q^{th}$ piece of data in the frequency domain filtered data $Y_{filter}$. $L_q$ represents a position of a subcarrier to which $y_{filter}(q)$ is mapped. $\Delta f$ is a subcarrier spacing, for example, $\Delta f$ in LTE may be 15 kHz, and $\Delta f$ in NR may be 7.5 kHz, 15 kHz, 30 kHz, or 60 kHz. $t_{offset}$ represents a delay offset, $t_{offset}$ is a real number, and a value of $t_{offset}$ may be preconfigured, or a value of $t_{offset}$ may be notified by the base station to the UE by using signaling. $N_{scale}^{ifft}$ is a coefficient used to adjust power of output data obtained through the inverse Fourier transform, and $N_{scale}^{ifft}$ is a real number, for example, $N_{scale}^{ifft}=1$ or 1.5. $q_{re,offset}$ is a frequency domain offset factor, and a value of $q_{re,offset}$ may be preconfigured, for example, $g_{re,offset}=1/2$, or a value of $g_{re,offset}$ may be notified by the base station to the UE by using signaling. j is an imaginary unit, and a square of the imaginary unit is equal to −1.

For example, during the inverse Fourier transform, a quantity of points of the transform is 2048. In other words, when a maximum of 2048 subcarriers exist on one time domain symbol, positions of the 2048 subcarriers are respectively from 0 to 2047. A subcarrier position of each piece of data in the frequency domain filtered data $Y_{filter}$ is a position of the data in the 2048 subcarriers.

Figure 4:
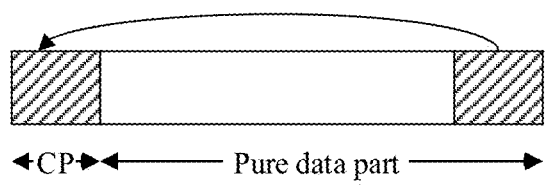
FIG. 4 is an example structural diagram of a time domain symbol according to an embodiment of this application.

In this embodiment of this application, the time domain symbol may be various types of time domain symbols, for example, a single carrier time domain symbol, an orthogonal frequency division multiplexing (OFDM) symbol, or a single carrier frequency division multiple access (SC-FDMA) symbol. One time domain symbol may include a time continuous signal with duration of $N \times T_s$. Alternatively, from a discrete perspective, one time domain symbol may include N pieces of data, and the N pieces of data may alternatively be described as N sampling points or a pure data part of the time domain symbol. Optionally, as shown in FIG. 4, the time domain symbol may further include a cyclic prefix (CP), and a length of the cyclic prefix is $N_{cp}$ sampling points. N and $N_c$ are positive integers. For example, N is 2048, 1024, or 512, and $N_{cp}$ is 160, 144, or 88. For the time domain symbol, a slot, a subframe, a radio frame, N, $N_{cp}$, and a time unit $T_s$, refer to corresponding descriptions in LTE or 5G. Details are not described herein. For example, in the LTE, the time unit $T_s$ is 1/(15000×2048) seconds. For example, in NR, the time unit $T_s$ may be 1/(15000×2048) seconds, 1/(15000×1024) seconds, or 1/(15000×512) seconds. Optionally, discrete sampling is performed on a time continuous signal of one time domain symbol, and the time unit $T_s$ may be a time interval between two adjacent sampling points in obtained sampling data.

As described above, the time domain signal obtained after the second processing is performed on the second frequency domain data is represented as the following at the moment t:

$$s(t) = \frac{1}{\sqrt{N_{scale}^{ifft}}} \sum_{q=0}^{Q-1} y_{filter}(q) e^{j \times 2\pi \times \Delta f \times L_q \times (t + t_{offset})}.$$

When the second processing includes cyclic prefix adding, discrete sampling is performed on s(t) by using $t = \tilde{n} \times T_s$, and for an $\tilde{n}^{th}$ sampling point in the time domain symbol, where $\tilde{n}=0, 1, 2, \ldots, (N+N_{cp})-1$, time domain data sent at the sampling point is:

$$s(\tilde{n} \cdot T_S) = \frac{1}{\sqrt{N_{scale}^{ifft}}} \sum_{q=0}^{Q-1} y_{filter}(q) e^{j \times 2\pi \times L_q \times (\tilde{n} - N_{cp})/N}.$$

Similarly, when the second processing does not include cyclic prefix adding, discrete sampling is performed on s(t) by using $t = \tilde{n} \times T_s$, and for an $\tilde{n}^{th}$ sampling point in the time domain symbol, where $\tilde{n}=0, 1, 2, \ldots, N-1$, time domain data sent at the sampling point is:

$$s(\tilde{n} \cdot T_s) = \frac{1}{\sqrt{N_{scale}^{ifft}}} \sum_{q=0}^{Q-1} y_{filter}(q) e^{j \times 2\pi \times L_q \times \tilde{n}/N}.$$

$$t_{offset} = -N_{cp} \cdot T_s, \quad T_s = \frac{1}{N \cdot \Delta f}, \quad T_s$$

represents a time interval between adjacent sampling points, and $\Delta f$ is a subcarrier spacing.

Optionally, when the second processing is performing the Fourier transform on the second frequency domain data, second frequency domain filtered data in the foregoing Fourier transform method may be replaced with the second frequency domain data, and the foregoing Fourier transform method is performed.

In this embodiment of this application, that the transmit end sends data may not only be that the transmit end directly sends the data over an air interface, but may also mean that the transmit end indirectly sends the data over an air interface. This is not limited in this application. When the transmit end indirectly sends the data over an air interface, the transmit end may send the data over the air interface after performing data processing, for example, after intermediate radio frequency modulation, on the data.

The method provided in this embodiment of this application may be applied to a case in which a transmit end sends data to a receive end on a channel. Correspondingly, the receive end may receive, on the channel, the data sent by the transmit end. The channel may be various possible channels or signals, such as a physical broadcast channel (PBCH), a primary synchronization signal (PSS), a secondary synchronization signal (SSS), a physical downlink shared channel (PDSCH), a physical downlink control channel (PDCCH), a physical uplink shared channel (PUSCH), a physical uplink control channel (PUCCH), various types of uplink reference signals (RS), various types of downlink RSs, or another possible physical channel. This is not limited in this application. When the method shown in FIG. 1 is applied to a case in which a transmit end sends data to a receive end on a channel. The to-be-sent data on the channel may be used as input data of the method shown in FIG. 1, and the transmit end may perform data processing based on the input data and the method shown in FIG. 1, to obtain corresponding output data, and send, on the channel, the output data to the receive end. A data type of the to-be-sent data may be modulated data.

In the method shown in FIG. 2, S201 may alternatively be implemented as: The transmit end performs first processing on BPSK modulated data with a length of M, to obtain first frequency domain data with a length of M, where the first processing includes phase rotation and Fourier transform.

In this embodiment of this application, when a piece of data is BPSK modulated data, it indicates that the data is data obtained after BPSK is performed on a to-be-modulated bit. For example, a value of the to-be-modulated bit and the obtained BPSK modulated data are shown in Table 1(a), Table 1(b), or Table 1(c).

TABLE 1(a)

| Value of to-be-modulated bit | BPSK modulated data |
|---|---|
| 0 | 1 |
| 1 | −1 |

TABLE 1(b)

| Value of to-be-modulated bit | BPSK modulated data |
|---|---|
| 0 | −1 |
| 1 | 1 |

TABLE 1(c)

| Value of to-be-modulated bit | BPSK modulated data (where j represents an imaginary unit) |
|---|---|
| 0 | $\frac{1+j}{\sqrt{2}}$ |
| 1 | $\frac{-1-j}{\sqrt{2}}$ |

In this embodiment of this application, the BPSK modulated data with a length of M represents M pieces of BPSK modulated data. For example, if the to-be-modulated bit includes M bits, the transmit end may perform BPSK modulation on each of the M bits, to obtain the BPSK modulated data with a length of M.

For example, it is assumed that the to-be-modulated bit is represented as b, and b includes M bits, where an $m^{th}$ piece of data is represented as b(m), and a value of b(m) is 0 or 1. A value of m ranges from 0 to M−1. BPSK modulation may be performed on the to-be-modulated bit b to obtain BPSK modulated data $d_{bpsk}$ with a length of M, where an $m^{th}$ piece of data in $d_{bpsk}$ is represented as $d_{bpsk}(m)$.

Optionally, $d_{bpsk}(m)=1-2\times b(m)$, $d_{bpsk}(m)=2\times b(m)-1$, or $$d_{bpsk}(m) = \frac{1}{\sqrt{2}}((1-2b(m))+j\times(1-2b(m))).$$

For the BPSK modulated data $d_{bpsk}$ with a length of M, a phase difference between two adjacent pieces of data in the modulated data is 0 or π. For example, a phase difference between $d_{bpsk}(m)$ and $d_{bpsk}(m+1)$ is 0 or π, where a value of m+1 ranges from 1 to M−1. In this embodiment of this application, the modulated data $d_{bpsk}$ may alternatively be obtained in another BPSK modulation scheme, and the another BPSK modulation scheme satisfies the following: A phase difference between two adjacent pieces of data in the modulated data is 0 or π.

The transmit end performs phase rotation on BPSK modulated data d with a length of M, to obtain phase rotation output data d, where an $m^{th}$ piece of data in d is represented as:

$d(m)=d_{bpsk}(m)\times e^{j\times\alpha_m}$, $m=0, 1, 2, \ldots, M-1$.

$e^{j\times\alpha_m}$ represents a rotation factor for performing phase rotation on $d_{bpsk}(m)$, and j represents an imaginary unit, that is, $j=\sqrt{-1}$. The rotation factor $e^{j\times\alpha_m}$ may be $e^{j\times\pi\times m/2}$, $e^{-j\times\pi\times m/2}$, $e^{j\times\pi\times(m\ mod\ 2)/2}$, or $e^{-j\times\pi\times(m\ mod2)/2}$. The phase rotation may be considered as performing Pi/2 phase rotation on the BPSK modulated data.

For example, when a value of M is 6, and data of the to-be-sent bit is [0, 1, 1, 0, 0, 1], BPSK data $d_{bpsk}$ obtained based on Table 1(a) is [1, −1, −1, 1, 1, −1] When the phase factor of the phase rotation is $e^{j\times\pi\times(m\ mod\ 2)/2}$, Pi/2-BPSK modulated data obtained by performing Pi/2 phase rotation on the BPSK data is [1, −j, −1, j, 1, −j].

A method for performing "BPSK modulated+phase rotation" on the to-be-modulated bit is equivalent to performing π/2-BPSK on the to-be-modulated bit. A method in which the transmit end performs Fourier transform (for example, Fourier transform, or phase rotation+Fourier transform) on the phase rotation output data d is similar to the method for performing Fourier transform on π/2-BPSK modulated data d by the transmit end in the foregoing S201, and is not described herein again.

In the method provided in this embodiment of this application, frequency domain data with a length of M is compressed to obtain frequency domain compressed data with a shorter length, so that bandwidth occupied during actual data transmission can be lower. Therefore, spectral efficiency of data transmission can be improved. In addition, the modulated data in the method provided in this embodiment of this application is π/2-BPSK, so that a characteristic of a low PAPR of the sent time domain data can be maintained. The phase difference between two adjacent pieces of modulated data in the Pi/2-BPSK modulated data with a length of M is π/2 or π/2, the two adjacent pieces of modulated data are oversampled and superposed during generation of the time domain data, and the phase difference π/2 or −π/2 can avoid co-directional superposition, and an amplitude of a maximum value can be reduced. Therefore, a PAPR of the sent time domain data can be reduced.

Figure 5:
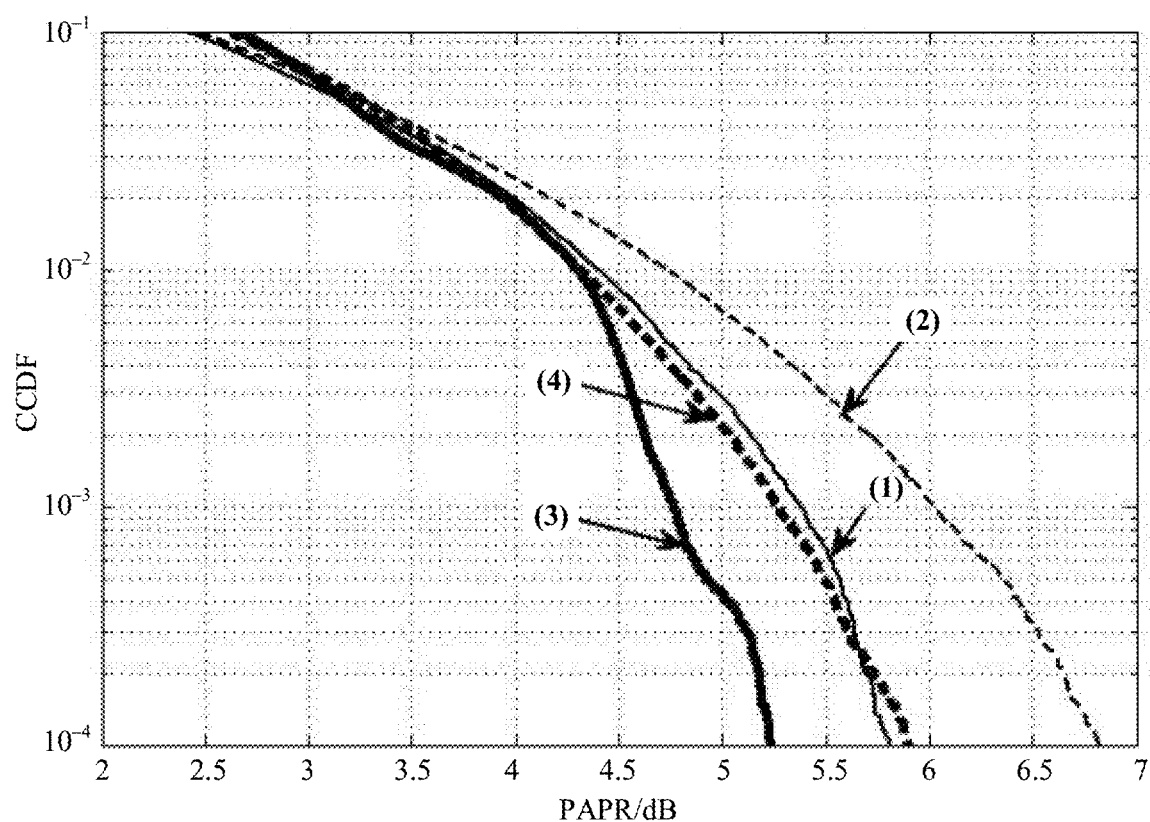
FIG. 5 is a diagram of a simulation result according to an embodiment of this application.

For one data transmission, FIG. 5 shows a simulation result according to an embodiment of this application. A horizontal axis represents a PAPR of time domain data, and a vertical axis represents a complementary cumulative distribution function (CCDF). A curve (1) is a PAPR of time domain data generated from QPSK modulated data with a length of 6 based on the method shown in FIG. 1; a curve (2) is a PAPR of time domain data generated from QPSK modulated data with a length of 12 based on the method shown in FIG. 1; a curve (3) is a PAPR of time domain data with M=12 and Q=6 based on the method according to the embodiment of this application (the method shown in FIG. 2); and a curve (4) is a PAPR of time domain data with M=24 and Q=12 based on the method according to this embodiment of this application. Spectral efficiency corresponding to the curve (1) and spectral efficiency corresponding to the curve (3) are consistent, and spectral efficiency corresponding to the curve (2) and spectral efficiency corresponding to the curve (4) are consistent. It can be learned from comparison between the curve (1) and the curve (3) that a PAPR gain of the method provided in this embodiment of this application is 0.6 dB. It can be learned from comparison between the curve (2) and the curve (4) that a PAPR gain of the method provided in this embodiment of this application is 0.9 dB.

In addition to being applied to BPSK modulation scheme and π/2-BPSK modulation scheme, the method provided in this embodiment of this application can also be applied to another modulation scheme. For example, the π/2-BPSK modulated data in the method provided in this embodiment of this application is replaced with data obtained after Kary pulse amplitude modulation (K-PAM) and Pi/2 phase rotation are sequentially performed on the to-be-modulated bit, or the BPSK modulated data in the method provided in this embodiment of this application is replaced with data obtained after K-PAM is performed on the to-be-modulated bit. A phase factor used for Pi/2 phase rotation is the same as the phase factor $e^{j \times \alpha_m}$ described above. $K=2^A$, and A is a positive integer, for example, 1, 2, 3, 4, or a larger value. This is not limited in this embodiment of this application. Each piece of modulated data obtained in the K-PAM modulation scheme may carry information of A bits.

For example, when K=2, a constellation point of 2-PAM modulated data may be represented as [−B B], where B is a real number, for example, B=1. Each piece of modulated data may carry information of A=1 bit. In this case, when a value of the information of one bit is 1, output of corresponding 2-PAM modulated data is B, and when the value of the information of one bit is 0, the output of the corresponding 2-PAM modulated data is −B; or when a value of the information of one bit is 1, output of corresponding 2-PAM modulated data is −B, and when the value of the information of one bit is 0, the output of the corresponding 2-PAM modulated data is B. Pi/2 phase rotation performed on the 2-PAM modulated data is equivalent to modulation in the Pi/2-BPSK modulation scheme.

For example, when K=4, a constellation point of 4-PAM modulated data may be represented as [−3B, −B B, 3B], where B is a real number. For example, B=√5/5. Each piece of modulated data may carry information of A=2 bits. In a possible implementation, when a value of the two bits is 00, output of corresponding 4-PAM modulated data is −3B, when the value of the two bits is 01, the output of the corresponding 4-PAM modulated data is −B, when the value of the two bits is 11, the output of the corresponding 4-PAM modulated data is B, and when the value of the two bits is 10, the output of the corresponding 4-PAM modulated data is 3 B. In the 4-PAM modulation scheme, a correspondence between the value of the two bits and the output of the 4-PAM modulated data may alternatively be in another form. This is not limited in this embodiment of this application.

The foregoing describes a data compression method on one time domain symbol. In one data transmission, the method may be separately applied to a plurality of time domain symbols. In other words, the method provided in this embodiment of this application is separately applied to to-be-sent data on each time domain symbol. M and Q corresponding to different time domain symbols may be the same or different. This is not limited in this embodiment of this application.

The foregoing describes the method provided in the embodiments of this application from a perspective of interaction between the base station and the UE. To implement functions in the method provided in this embodiment of this application, the base station and/or the UE may include a hardware structure and/or a software module, and implement the functions in a form of the hardware structure, or the software module, or the hardware structure and the software module. Whether a function in the foregoing functions is performed in a manner of the hardware structure, or the software module, or the hardware structure and the software module depends on a specific application and a design constraint of the technical solutions.

Figure 6:
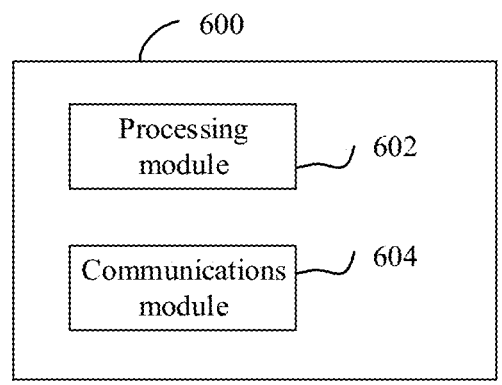
FIG. 6 and FIG. 7 are example structural diagrams of an apparatus according to an embodiment of this application.

FIG. 6 is a schematic structural diagram of an apparatus 600 according to an embodiment of this application. The apparatus 600 may be UE or a base station, and can implement the method provided in the embodiments of this application. Alternatively, the apparatus 600 may be an apparatus that can support UE or a base station in implementing the method provided in the embodiments of this application. The apparatus 600 may be installed on the base station or the UE. The apparatus 600 may be a hardware structure, a software module, or a hardware structure and a software module. The apparatus 600 may be implemented by a chip system.

The apparatus 600 includes a processing module 602 and a communications module 604. The processing module 602 may generate a signal for sending, and may send the signal by using the communication module 604. The processing module 602 may receive the signal by using the communication module 604, and process the received signal. The processing module 602 is coupled to the communications module 604.

The coupling in this embodiment of this application is indirect coupling or a connection between apparatuses, units, or modules. The coupling may be in an electrical, mechanical, or another form, and is used for information exchange between apparatuses, units, or modules. The coupling may be a wired connection or a wireless connection.

In this embodiment of this application, the communications module may be a circuit, a module, a bus, an interface, a transceiver, a pin, or another apparatus that can implement a transceiver function. This is not limited in this embodiment of this application.

Figure 7:
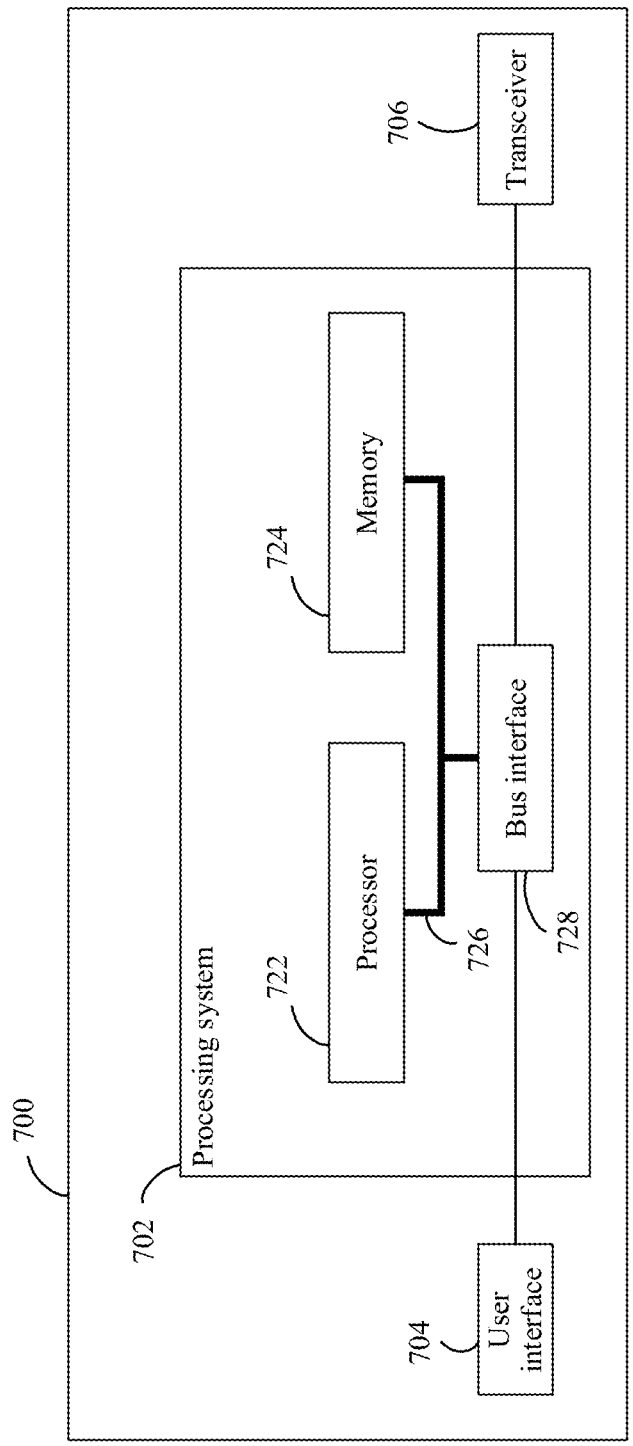

FIG. 7 is a schematic structural diagram of an apparatus 700 according to an embodiment of this application. The apparatus 700 may be a terminal device or a base station, and can implement the method provided in the embodiments of this application. Alternatively, the apparatus 700 may be an apparatus that can support a terminal device or a base station in implementing the method provided in the embodiments of this application, for example, a chip system. The apparatus 700 may be installed on the base station or the terminal device.

As shown in FIG. 7, the apparatus 700 includes a processing system 702, configured to implement or support the terminal device or the base station in implementing the method provided in the embodiments of this application. The processing system 702 may be a circuit, and the circuit may be implemented by a chip system. The processing system 702 includes one or more processors 722, and may be configured to implement or support the terminal device or the base station in implementing the method provided in the embodiments of this application. When the processing system 702 includes another apparatus other than the processor 722, the processor 722 may be further configured to manage the another apparatus included in the processing system 702. For example, the another apparatus may be one or more of a memory 724, a bus 726, and a bus interface 728 described below. For example, the processor 722 may be configured to manage the memory 724, or the processor 722 may be configured to manage the memory 724, the bus 726, and the bus interface 728.

The processing system 702 may further include one or more memories 724, configured to store instructions and/or data. The memory 724 may be included in the processor 722. If the processing system 702 includes the memory 724, the processor 722 may be coupled to the memory 724. The processor 722 may cooperate with the memory 724. The processor 722 may execute the instructions stored in the memory 724. When executing the instructions stored in the memory 724, the processor 722 may implement or support UE or the base station in implementing the method provided in the embodiments of this application. The processor 722 may also read the data stored in the memory 724. The memory 724 may also store data obtained when the processor 722 executes the instructions.

In this embodiment of this application, the memory includes a volatile memory, for example, a random-access memory (RAM). The memory may alternatively include a non-volatile memory, for example, a flash memory, a hard disk drive (HDD), or a solid-state drive (SSD). The memory may alternatively include a combination of the foregoing types of memories. The memory may alternatively include any other apparatus having a storage function, such as a circuit, a device, or a software module.

The processing system 702 may also include the bus interface 728, configured to provide an interface between the bus 726 and another apparatus. The bus interface may also be referred to as a communications interface. In this embodiment of this application, the communications interface may be a circuit, a module, a bus, an interface, a transceiver, or another apparatus that can implement a transceiver function. This is not limited in this embodiment of this application.

Optionally, the apparatus 700 includes a transceiver 706, configured to communicate with another communications device by using a transmission medium, so that another apparatus in the apparatus 700 may communicate with the another communications device. The another apparatus may be the processing system 702. For example, the another apparatus in the apparatus 700 may communicate with the another communications device by using the transceiver 706, and receive and/or send corresponding information. This may also be described as: The another apparatus in the apparatus 700 may receive corresponding information, where the corresponding information is received by the transceiver 706 by using a transmission medium, and the corresponding information may be exchanged between the transceiver 706 and the another apparatus in the apparatus 700 through the bus interface 728 or through the bus interface 728 and the bus 726; and/or the another apparatus in the apparatus 700 may send corresponding information, where the corresponding information is sent by the transceiver 706 by using a transmission medium, and the corresponding information may be exchanged between the transceiver 706 and the another apparatus in the apparatus 700 through the bus interface 728 or through the bus interface 728 and the bus 726.

The apparatus 700 may also include a user interface 704. The user interface 704 is an interface between a user and the apparatus 700, and may be used by the user to perform information exchange with the apparatus 700. For example, the user interface 704 may be at least one of a keyboard, a mouse, a display, a speaker, a microphone, and a joystick.

The foregoing mainly describes an apparatus structure provided in the embodiment of this application from a perspective of the apparatus 700. In the apparatus, the processing system 702 includes the processor 722, and may further include one or more of the memory 724, the bus 726, and the bus interface 728, to implement the method provided in the embodiments of this application. The processing system 702 also falls within the protection scope of this application.

In the apparatus embodiments of this application, division into modules of the apparatus is logical function division, and there may be another division manner in actual implementation. For example, functional modules of the apparatus may be integrated into one module, or each functional module may exist alone, or two or more functional modules may be integrated into one module.

All or some of the foregoing methods in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

In the embodiments of this application, on the premise that there is no logical contradiction, the embodiments may be mutually referenced. For example, methods and/or terms in the method embodiments may be mutually referenced. For example, functions and/or terms in the apparatus embodiments may be mutually referenced. For example, functions and/or terms between the apparatus embodiments and the method embodiments may be mutually referenced.

The foregoing embodiments are merely used to describe the technical solutions of this application, but are not used to limit the protection scope thereof. Modification, equivalent replacement, or improvement made without departing from the basis of the technical solutions of this application shall fall within the protection scope of this application.

What is claimed is:

1. A method performed at a transmit end, comprising:
 performing a first processing on binary phase shift keying (BPSK) modulated data with a length of M, to obtain a first frequency domain data with a length of M, wherein the first processing comprises Fourier transform, and M is an even number;

performing a second processing on a second frequency domain data with a length of Q, to obtain a time domain data, wherein data in the second frequency domain data is comprised in the first frequency domain data, Q is a positive integer, M is greater than Q, Q is greater than or equal to M/2, and the second processing comprises inverse Fourier transform; and sending the time domain data on one time domain symbol;

wherein a $q^{th}$ piece of frequency domain data in the second frequency domain data is selected from one of the group of an $(\lfloor M-Q+1)/2 \rfloor q)^{th}$ piece of frequency domain data in the first frequency domain data, an $(\lfloor M-Q/2 \rfloor +q)^{th}$ piece of frequency domain data in the first frequency domain data, or an $(\lceil M-Q/2 \rceil +q)^{th}$ piece of frequency domain data in the first frequency domain data, wherein a value of q is an integer ranging from 0 to Q−1.

2. The method according to claim 1, wherein the second processing further comprises at least one of inverse Fourier transform and cyclic prefix adding, frequency domain filtering, inverse Fourier transform, and cyclic prefix adding, or inverse Fourier transform, time domain filtering, and cyclic prefix adding.

3. The method according to claim 2, wherein a square root raised cosine (SRRC) filter or a root raised cosine (RRC) filter is used when the frequency domain filtering or the time domain filtering is performed, and a roll-off factor of a used filter is $$\frac{2Q}{M} - 1.$$

4. The method according to claim 1, wherein when the inverse Fourier transform is performed, the method comprises:

mapping the second frequency domain data to Q subcarriers to perform Fourier transform, wherein a frequency domain resource used to send the -BPSK modulated data with a length of M comprises the Q subcarriers.

5. The method according to claim 1, wherein the first processing comprises:

the first processing sequentially comprises phase rotation and Fourier transform, wherein for an $m^{th}$ piece of modulated data, a phase factor of the phase rotation is $e^{-j \times \pi \times m/M}$, Q=M/2, and a value of m is an integer ranging from 0 to M−1.

6. A communications apparatus, comprising a processor and a communications interface, wherein the processor is configured to perform first processing on binary phase shift keying (BPSK) modulated data with a length of M, to obtain first frequency domain data with a length of M, wherein the first processing comprises Fourier transform, and M is an even number;

the processor is further configured to perform second processing on second frequency domain data with a length of Q, to obtain time domain data, wherein data in the second frequency domain data is comprised in the first frequency domain data, Q is a positive integer, M is greater than Q, Q is greater than or equal to M/2, and the second processing comprises inverse Fourier transform; and the processor sends the time domain data on one time domain symbol through the communications interface;

wherein a $q^{th}$ piece of frequency domain data in the second frequency domain data is selected from one of the group of an $(\lfloor (M-Q+)/2 \rfloor +q)^{th}$ piece of frequency domain data in the first frequency domain data, an $(\lfloor (M-Q)/2 \rfloor +q)^{th}$ piece of frequency domain data in the first frequency domain data, or an $(\lceil (M-Q)/2 \rceil +q)^{th}$ piece of frequency domain data in the first frequency domain data, wherein a value of q is an integer ranging from 0 to Q−1.

7. The communications apparatus according to claim 6, wherein the second processing further comprises at least one of inverse Fourier transform and cyclic prefix adding, frequency domain filtering, inverse Fourier transform, and cyclic prefix adding, or inverse Fourier transform, time domain filtering, and cyclic prefix adding.

8. The communications apparatus according to claim 7, wherein a square root raised cosine (SRRC) filter or a root raised cosine (RRC) filter is used when the frequency domain filtering or the time domain filtering is performed, and a roll-off factor of a used filter is $$\frac{2Q}{M} - 1.$$

9. The communications apparatus according to claim 6, wherein when the inverse Fourier transform is performed, the processor is configured to:

map the second frequency domain data to Q subcarriers to perform Fourier transform, wherein a frequency domain resource used to send the BPSK modulated data with a length of M comprises the Q subcarriers.

10. The communications apparatus according to claim 6, wherein the first processing comprises:

the first processing sequentially comprises phase rotation and Fourier transform, wherein for an $m^{th}$ piece of modulated data, a phase factor of the phase rotation is $e^{-j \times \pi \times m/M}$, Q=M/2, and a value of m is an integer ranging from 0 to M−1.

11. A non-transitory computer-readable storage medium, comprising instructions, wherein when the instructions are executed by at least one processor, cause the at least one processor to perform operations comprising:

performing first processing on π/2-binary phase shift keying (BPSK) modulated data with a length of M, to obtain first frequency domain data with a length of M, wherein the first processing comprises Fourier transform, and M is an even number;

performing second processing on second frequency domain data with a length of Q, to obtain time domain data, wherein data in the second frequency domain data is comprised in the first frequency domain data, Q is a positive integer, M is greater than Q, Q is greater than or equal to M/2, and the second processing comprises inverse Fourier transform; and sending the time domain data on one time domain symbol;

wherein a $q^{th}$ piece of frequency domain data in the second frequency domain data is selected from one of the group of an $(\lfloor (M-Q+1)/2 \rfloor +q)^{th}$ piece of frequency domain data in the first frequency domain data, an $(\lfloor (M-Q)/2 \rfloor +q)^{th}$ piece of frequency domain data in the first frequency domain data, or an $(\lceil (M-Q)/2 \rceil +q)^{th}$ piece of frequency domain data in the first frequency domain data, wherein a value of q is an integer ranging from 0 to Q−1.

12. The non-transitory computer-readable storage medium according to claim 11, wherein the second processing comprises at least one of inverse Fourier transform and cyclic prefix adding, frequency domain filtering, inverse Fourier transform, and cyclic prefix adding, or inverse Fourier transform, time domain filtering, and cyclic prefix adding.

13. The non-transitory computer-readable storage medium according to claim 12, wherein a square root raised cosine (SRRC) filter or a root raised cosine (RRC) filter is used when the frequency domain filtering or the time domain filtering is performed, and a roll-off factor of a used filter is $$\frac{2Q}{M}-1.$$

14. The non-transitory computer-readable storage medium according to claim 13, wherein when the inverse Fourier transform is performed, the operations comprises:

mapping the second frequency domain data to Q subcarriers to perform Fourier transform, wherein a frequency domain resource used to send the π/2-BPSK modulated data with a length of M comprises the Q subcarriers.

15. The non-transitory computer-readable storage medium according to claim 11, wherein the first processing comprises:

the first processing sequentially comprises phase rotation and Fourier transform, wherein for an $m^{th}$ piece of modulated data, a phase factor of the phase rotation is $e^{-j\times m\times m/M}$, Q=M/2, and a value of m is an integer ranging from 0 to M−1.

\* \* \* \* \*